(12) United States Patent
Holmes et al.

(10) Patent No.: US 11,529,823 B2
(45) Date of Patent: Dec. 20, 2022

(54) SECURITY DEVICE AND METHOD OF MANUFACTURE THEREOF

(71) Applicant: DE LA RUE INTERNATIONAL LIMITED, Basingstoke (GB)

(72) Inventors: Brian Holmes, Fleet (GB); Frederic Fournier, Thatcham (GB); Maria King, Andover (GB)

(73) Assignee: DE LA RUE INTERNATIONAL LIMITED, Basingstoke (GB)

(*) Notice: Subject to any disclaimer, the term of this patent is extended or adjusted under 35 U.S.C. 154(b) by 0 days.

(21) Appl. No.: 17/056,636

(22) PCT Filed: May 17, 2019

(86) PCT No.: PCT/GB2019/051374
§ 371 (c)(1),
(2) Date: Nov. 18, 2020

(87) PCT Pub. No.: WO2019/220140
PCT Pub. Date: Nov. 21, 2019

(65) Prior Publication Data
US 2021/0197610 A1 Jul. 1, 2021

(30) Foreign Application Priority Data
May 18, 2018 (GB) ..................................... 1808137

(51) Int. Cl.
*B42D 25/328* (2014.01)
*B42D 25/355* (2014.01)
(Continued)

(52) U.S. Cl.
CPC ......... *B42D 25/328* (2014.10); *B42D 25/355* (2014.10); *B42D 25/42* (2014.10);
(Continued)

(58) Field of Classification Search
CPC .................................................... B42D 25/328
See application file for complete search history.

(56) References Cited

U.S. PATENT DOCUMENTS

| 4,568,141 A | * | 2/1986 | Antes | ....................... G03H 1/30 |
| | | | | 359/2 |
| 5,784,200 A | * | 7/1998 | Modegi | ................ G02B 5/1847 |
| | | | | 359/2 |

(Continued)

FOREIGN PATENT DOCUMENTS

| CN | 101727778 A | 6/2010 | |
| DE | 4243905 A1 * | 6/1994 | ........... B42D 25/328 |

(Continued)

OTHER PUBLICATIONS

Nov. 19, 2018 Search Report issued in Great Britain Patent Application No. GB1808137.2.
(Continued)

*Primary Examiner* — Kyle R Grabowski
(74) *Attorney, Agent, or Firm* — Oliff PLC

(57) ABSTRACT

A security device includes a diffractive structure, including grating elements and having a first area, the grating elements within a region have a constant pitch or spacing; the first area regions pitches or spacings increase from one region to the next between a first region having a grating element pitch or spacing of less than or equal to 0.6 microns and an end region having a grating element pitch or spacing of greater than or equal to 5 microns; upon illumination and viewing along a first viewing direction substantially orthogonal to the first axis, the device exhibits a first optical effect in that at least one region exhibits a diffractive colour; each region has at least first and second sub-regions having different grating element orientations within the plane of the device such that the first optical effect is exhibited at more than one angle of tilt about the second axis.

19 Claims, 10 Drawing Sheets

(51) Int. Cl.
    *B42D 25/42*     (2014.01)
    *G02B 5/18*     (2006.01)
    *B42D 25/23*     (2014.01)
    *B42D 25/24*     (2014.01)
    *B42D 25/29*     (2014.01)
    *B42D 25/324*     (2014.01)

(52) U.S. Cl.
    CPC ............ *G02B 5/1819* (2013.01); *B42D 25/23* (2014.10); *B42D 25/24* (2014.10); *B42D 25/29* (2014.10); *B42D 25/324* (2014.10)

(56) References Cited

U.S. PATENT DOCUMENTS

| | | | | |
|---|---|---|---|---|
| 6,226,127 | B1* | 5/2001 | Dunn | G02B 5/32 |
| | | | | 359/628 |
| 2010/0254007 | A1* | 10/2010 | Toda | B42D 25/328 |
| | | | | 359/567 |
| 2016/0001585 | A1* | 1/2016 | Suzuki | G03H 1/30 |
| | | | | 359/572 |
| 2016/0339733 | A1* | 11/2016 | Holmes | B42D 25/328 |
| 2017/0341454 | A1 | 11/2017 | Seils et al. | |

FOREIGN PATENT DOCUMENTS

| | | |
|---|---|---|
| EP | 2 447 743 A1 | 5/2012 |
| JP | 2000-131516 A | 5/2000 |
| JP | 2007-334074 A | 12/2007 |
| WO | 2009/128168 A1 | 10/2009 |

OTHER PUBLICATIONS

Sep. 19, 2019 Search Report and Written Opinion issued in International Patent Application No. PCT/GB2019/051374.

* cited by examiner

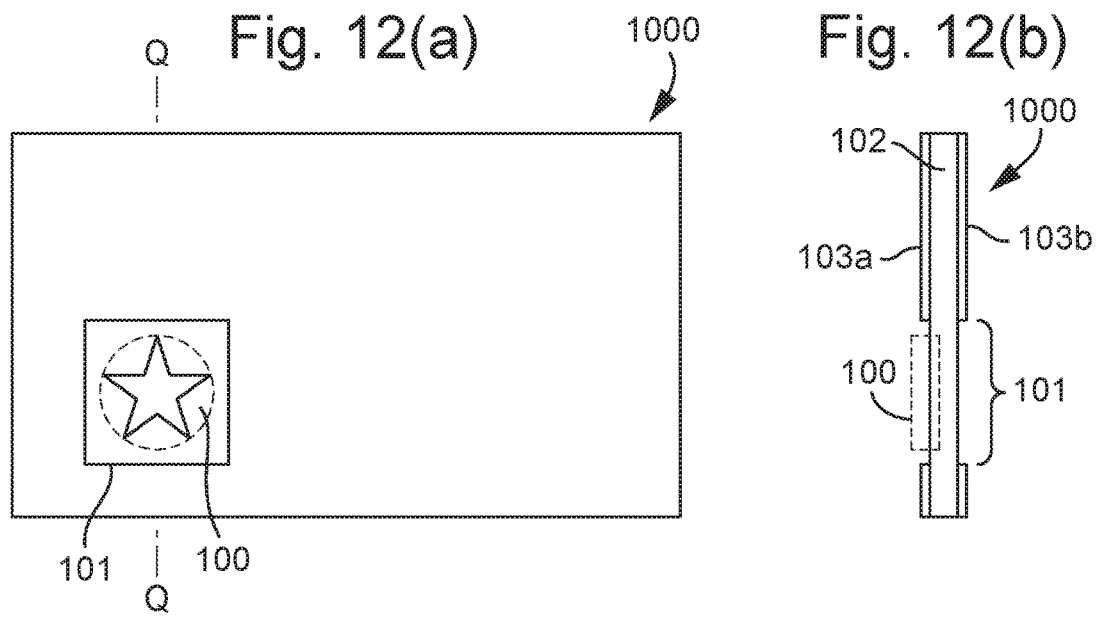
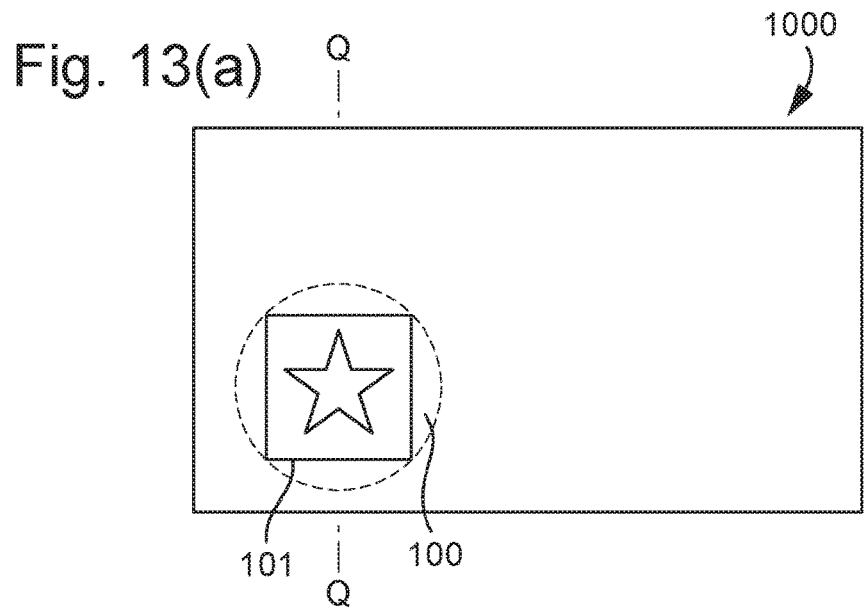
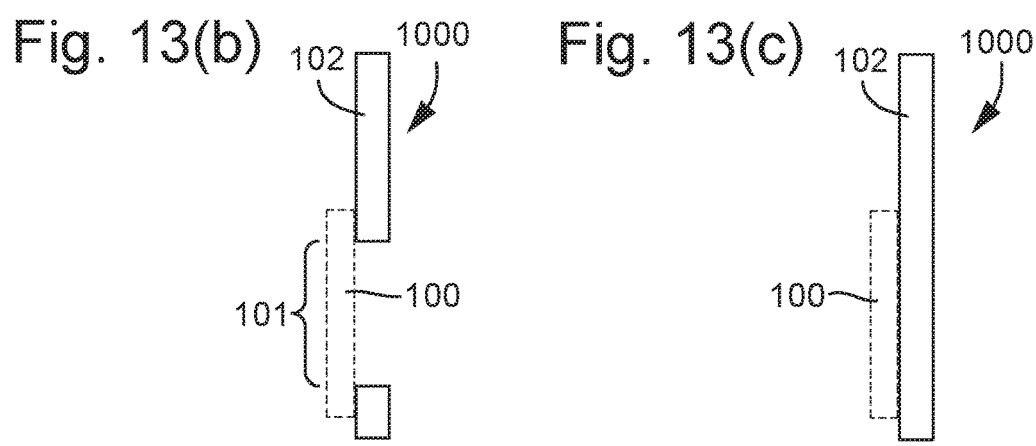

SECURITY DEVICE AND METHOD OF MANUFACTURE THEREOF

FIELD OF THE INVENTION

This invention relates to security devices for use in checking the authenticity of articles of value, particularly security documents such as banknotes, passports, identity documents, driving licenses, stamps, visas and the like. Methods of making the security devices are also disclosed.

BACKGROUND TO THE INVENTION

Articles of value, and particularly documents of value such as banknotes, cheques, passports, identification documents, certificates and licenses, are frequently the target of counterfeiters and persons wishing to make fraudulent copies thereof and/or changes to any data contained therein. Typically such objects are provided with a number of visible security devices for checking the authenticity of the object. Examples include features based on one or more patterns such as micro text, fine line patterns, latent images, venetian blind devices, lenticular devices, moiré interference devices and moiré magnification devices, each of which generates a secure visual effect. Other known security devices include holograms, watermarks, embossing's, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of security devices are those which produce an optically variable effect, meaning that the appearance of the device is different at different angles of view. Such devices are particularly effective since direct copies (e.g. photocopies) will not produce the optically variable effect and hence can be readily distinguished from genuine devices. Optically variable effects can be generated based on various different mechanisms, including holograms and other diffractive devices such as Kinegrams™, and also devices which make use of focusing elements such as lenses, including moiré magnifier devices, integral imaging devices and so-called lenticular devices.

Diffractive security devices such as holograms and Kinegrams™ have a number of benefits including the ability to generate strong and distinctive visual effects whilst being very difficult to replicate without specialist equipment. Nonetheless, new security devices and effects are necessary in order to stay ahead of counterfeiters' ability to imitate existing designs.

As a further consideration, diffractive security devices such as holograms and Kinegrams are conventionally designed to be viewed upon either azimuthal rotation of the device within its plane or by "horizontal" tilting of the device. For example, in the arrangement of FIG. 1 which illustrates a banknote 1000 comprising a security device 100, a conventional diffractive security device would typically be configured to be viewed by either rotating the banknote about the z axis, or by tilting the banknote about a tilt axis parallel with the y axis (referred to as "horizontal" tilting). These methods of viewing a security device are typically used as they most readily utilise typical illumination and viewing conditions. However, in order to check the authenticity of such a device, the more intuitive motion for an observer would be to tilt the banknote "vertically", i.e. about a tilt axis parallel with the x axis, and there is therefore a desire to provide a security device that provides an authenticatable effect upon "vertical" tilting.

SUMMARY OF THE INVENTION

In accordance with a first aspect of the invention there is provided a security device comprising a diffractive structure, the diffractive structure comprising a plurality of grating elements each having a principal component of orientation within the plane of the device substantially parallel with a first axis lying in the plane of the device; the diffractive structure having a first area comprising a plurality of regions arranged as a first contiguous pattern, wherein the grating elements within a region have either (i) a constant pitch or (ii) a constant spacing along a second axis orthogonal to the first axis and wherein; the pitches or spacings of the plurality of regions of the first area increase from one region to the next between a first region having a grating element pitch or spacing of less than or equal to 0.6 microns and an end region having a grating element pitch or spacing of greater than or equal to 5 microns such that; upon illumination and viewing along a first viewing direction substantially orthogonal to the first axis, the device exhibits a first optical effect in that at substantially any angle of tilt about the first axis at least one region exhibits a diffractive colour, and further wherein; each region comprises at least first and second sub-regions having different grating element orientations within the plane of the device such that the first optical effect is exhibited at more than one angle of tilt of the device about the second axis.

The pitches or spacings of the plurality of regions increase from one region to the next, meaning that different regions will diffract incident light to different positions, or tilt angles, along the first viewing direction. In other words different regions will replay at different viewing angles along the first viewing direction. The first region has a grating element pitch or spacing of less than or equal to 0.6 microns (i.e. greater than or equal to 1666 lines per mm) and therefore diffracts incident light at a large angle away from the angle of specular reflection. Conversely, the end region has a grating element pitch or spacing of greater than or equal to 5 microns (i.e. less than or equal to 200 lines per mm), meaning that light incident upon this region is diffracted through an angle very close to the angle of specular reflection (typically within 6 degrees of the specular reflection angle). As a result of the very large range of grating pitch or spacing between the first and end regions, and the different pitches or spacings from region to region, at substantially any one tilt angle about the first axis, at least one region will exhibit a diffractive colour when the device is viewed along the first viewing direction.

For example, at a tilt angle about the first axis close to the angle of specular reflection, an observer viewing the device along the first viewing direction will observe a diffractive colour exhibited by at least the end region, and at a tilt angle significantly spaced from the angle of specular reflection (typically greater than 60 degrees), an observer will see a diffractive colour exhibited by at least the first region. At intermediate angles of tilt, at least one of the regions between the first and end regions will exhibit a diffractive colour.

Consider the device being illuminated by near normal illumination. Using the diffraction grating equation $$\sin \Theta = n\lambda/d,$$

where $\Theta$ is the angle of diffraction (tilt angle about the first axis), $\lambda$ is the relevant wavelength, d is the grating pitch and n is the diffraction order, we can see that the shortest wavelength of visible light (~400 nm) will be diffracted by ~1 degree from the normal by the end region having a pitch or spacing of greater than or equal to 5 microns (i.e. very close to the specular reflection angle). Conversely, the first region having a pitch or spacing of less than or equal to 0.6 microns will diffract incident light by 90 degrees (e.g. a region with pitch or spacing of 0.6 microns will diffract a wavelength of 600 nm by 90 degrees).

As such, at substantially any angle of tilt about the first axis, at least one region will exhibit a diffractive colour.

Furthermore, the first optical effect further comprises, when the device is tilted about the first tilt axis, diffractive colours exhibited by the regions appearing to move from one region to the next within the contiguous pattern. In other words, as the device is tilted about the first axis, each region will sequentially replay or "switch on", creating the impression of a colour animation effect. It will be appreciated that the tilt angles at which individual regions replay may overlap, and therefore typically, at a particular angle of tilt about the first axis, more than one region exhibits a diffractive colour, with the colours of each replaying region differing at that tilt angle due to the difference in pitch or spacing.

Due to the fact that at least one region will be visible at angles of tilt about the first axis close to the specular reflection angle, the device may be described as a substantially (or "quasi") on-axis diffractive device.

These effects mean that the security device of the present invention is particularly suited to exhibiting a variable optical effect upon "vertical" tilting where the device will be subject to overhead illumination. Due to the range of pitches or spacing of the regions, the device will replay at substantially all angles of tilt for vertical tilting, thus providing an authenticatable optical effect to a viewer. As discussed above, an optically variable effect visualised by vertical tilting is deemed to be more easily perceived by the public.

Particularly advantageously, the range of tilt angles about the first tilt axis at which at least one region of the device replays (typically at least 60 degrees, preferably at least 80 degrees and more preferably substantially 90 degrees) is greater than the typical angular subtends of most diffuse lighting scenarios which ensures that at the colour animation effect is observable in most diffuse lighting conditions.

The grating elements each have a principal component of orientation within the plane of the device substantially parallel with a first axis lying in the plane of the device. In other words, each grating element is orientated such that it defines an angle with the first axis of less than 45 degrees. In preferred embodiments, each grating element is orientated such that it defines an angle with the first axis of less than 40 degrees, more preferably less than 20 degrees. Preferably at least one of the sub-regions comprises grating elements orientated parallel with the first axis (i.e. 0 degrees).

Preferably, at least one sub-region comprises grating elements defining an angle with the first axis of equal to or more than 5 degrees. As the range of orientations of the grating elements within the sub-regions define the range of tilt angles about the second axis within which the first optical effect is observed, at least one of the sub-regions having grating elements defining an angle of more than 5 degrees with the first axis advantageously means that the device will replay through a beneficially increased range of tilt angles about the second axis (i.e. rather than only within a narrow range of tilt angles about the second axis).

If we assume that the source of illumination is directly above the observer and the device, then the principal plane of reflection and dispersion (that containing the incident and reflected beams) is orthogonal to the device (vertical), and intersects the device along the first viewing direction. The grating elements of the device each have a grating vector k perpendicular to the grating orientation. The plane of dispersion of each grating element (the plane within which white light is split into its component wavelengths) intersects the plane of the device along its grating vector. The grating vector of each grating element defining a non-zero angle with the first axis has a principal projection (or component) onto the principal plane of dispersion and reflection (i.e. along the first viewing direction) of k cos $\varphi$, where $\varphi$ is the angle of orientation of the element with respect to the first axis. The device replays at least one region at substantially any viewing angle within the principal plane of dispersion, i.e. for substantially any tilt angle about the first tilt axis when the device is viewed along the first viewing direction.

Here "white light" refers to the visible part of the electromagnetic spectrum e.g. between about 390 to 700 nm.

Each region comprises at least first and second sub-regions having different grating element orientations within the plane of the device such that the first optical effect is exhibited at more than one angle of tilt of the device about the second axis (which is orthogonal to the first axis). In other words, the grating elements within the first sub-region have the same orientation (azimuthal angle) as each other and the grating elements within the second sub-region have the orientation as each other which is different to the orientation of the grating elements in the first sub-region. As both the first and second sub-regions are in the same region, they have the same grating element pitch or spacing.

We have discussed above the effect of tilting the device about the first axis. Upon viewing the device along the first viewing direction and tilting about the second axis (orthogonal to the first axis), the sub-regions will replay at different tilt angles (including 0 degrees) dependent on the orientation of the grating elements within that sub-region. The orientations of the grating elements within the sub-regions may be such that their replay angles on tilting about the second axis overlap and so both may be simultaneously visible at a particular angle of tilt about the second axis. At other angles of tilt about the second axis only one sub-region may replay. However, even at an angle of tilt about the second axis at which only one sub-region replays, the respective region will still exhibit a diffractive colour at a particular angle of tilt about the first axis dependent on the grating element pitch or spacing.

The use of sub-regions of different grating element orientation advantageously means that the range of tilt angles about the second tilt axis at which the vertical tilting effect (tilting about the first axis) is exhibited, is increased. This also allows the vertical tilting effect to be exhibited on different azimuthal orientations of the device (i.e. rotation angles of the device about its normal).

The grating elements within a region have either (i) a constant pitch or (ii) a constant spacing along a second axis perpendicular to the first axis. When the device is viewed along the first viewing direction, it is the projection of the grating vector along the first viewing direction that determines the colour exhibited to a viewer by the grating elements. As will be appreciated, if the pitch (the distance between corresponding points of the grating elements, here measured along the direction of the grating vector) of the grating elements within a region is constant, the dimension of this projection along the first viewing direction will differ slightly between the sub-regions of a region due to the differences in orientation. Consequently, each sub-region will replay a slightly different wavelength (colour) when viewed along the first viewing direction and the device is tilted about the second axis. In some embodiments, this may provide a striking optical effect in itself, with a colours appearing to move from sub-region to sub-region upon tilting about the second axis. For example, in embodiments, the grating elements within a region have a constant pitch, and the grating element orientations of the first and second sub-regions are such that upon tilting the device about the second axis, the first and second sub-regions exhibit different perceived colours.

Preferably however, the orientation difference between the sub-regions of a region is such that the colours exhibited by the sub-regions of a region are perceived to be the same, i.e. the region replays a substantially uniform colour when the device is rotated about the second axis. For example, a 10 degree difference in rotation between grating elements of different sub-regions gives a small 1.5% change in the length of the grating vector projection along the first viewing direction and as such the sub-regions would be perceived to replay substantially the same colour.

Alternatively, the grating elements within a region may have a constant spacing along a second axis perpendicular to the first axis. In other words, the dimension of the grating vector projection along the first viewing direction will be the same in different sub-regions of a region such that upon tilting of the device about the second axis, each sub-region replays the same colour. It will be appreciated that the pitch of the grating elements will differ from sub-region to sub-region in order to provide this requirement.

In preferred embodiments the grating elements within a region have constant pitch, as this configuration is typically more straightforward to fabricate.

In embodiments, each sub-region may have a dimension such that it is not discernible by the naked human eye. In other words, each sub-region may have a dimension of less than 200 microns, preferably less than 150 microns and more preferably less than 100 microns. This may be the case in embodiments where the orientations of the sub-regions are such that the colours exhibited by the sub-regions on tilting about the second axis are perceived to be the same. In embodiments where the pitches and orientations are such that sub-regions may replay perceptibly different colours on rotating about the second axis (to give a colour animation effect), preferably each sub-region is discernible to the naked human eye, i.e. larger than 200 microns.

The grating elements of the diffractive structure define alternate bands of maxima and minima. The bands may take the form of alternating high and low optical densities (e.g. opaque bands spaced by transparent bands), in which case the diffractive effect will operate on the principle of amplitude-difference and the diffractive structure is a transmission amplitude grating structure. Alternating bands of high and low reflectivity would form a reflective amplitude grating structure. The grating elements may be in the form of physical peaks and troughs forming a surface relief, in which case the structure will be a phase-difference diffractive structure. In both cases the structure will be formed in or on a carrier, such as a layer of lacquer or resin. Where the structure is formed as a surface relief on the carrier, preferably a reflection-enhancing layer (such as metal or a high refractive index material) will be applied so as to follow the contours of the relief, to improve its visibility.

The surface relief may have different profiles, such as a sinusoidal, rectangular or triangular profile. The type of surface relief profile may affect diffraction efficiency, but it is the pitch of the grating elements that determines the angular dispersion or "spread" of colours—and hence the colour exhibited by a region at a particular tilt angle about the first axis. Typically the profile depth of a surface relief defining the grating elements is no greater than 1 micron, preferably no greater than 0.5 microns.

The diffractive structure has a first area comprising a plurality of regions arranged as a first contiguous pattern. The term "contiguous" is used here to mean that the regions are arranged in a sequence within the contiguous pattern. The regions within the pattern preferably abut one another, but in alternative embodiments may be spaced apart.

Different arrangements of the regions within the first area are envisaged. For example, the regions of the first area may be arranged in a substantially linear or curvilinear manner along a pattern direction, and wherein the grating element pitches or spacings of the regions increase from one region to the next along the pattern direction. In such an example, upon tilting the device about the first axis, the diffractive colours exhibited by the regions appear to move sequentially from region to region along the pattern direction. In another example, the regions of the first area may be arranged in a substantially concentric manner. In such an arrangement, upon tilting of the device about the first axis, the pattern is perceived to expand and contract as different regions replay at their respective angles of tilt about the first axis.

The pitches or spacings of the plurality of regions preferably increase from one region to the next in a substantially linear manner, i.e. a uniform difference in pitch or spacing between adjacent regions within the first area. However, in alternative embodiments, the pitches or spacings may increase from one region to the next in a non-linear manner. In embodiments, the pitches or spacings of the regions of the first area may increase in a uniform manner in some parts and in a non-uniform manner in other parts.

Preferably, each sub-region has a dimension orthogonal to the orientation of its grating elements such that it accommodates at least ten grating elements. For example, a sub-region having grating elements with pitch or spacing of 0.6 microns preferably has a minimum dimension along the grating repeating direction of 6 microns, whereas a sub-region comprising grating elements with pitch or spacing of 5 microns preferably has a minimum dimension along the grating repeating direction of 50 microns. Preferably, the geometry of each sub-region is such that substantially each part of the sub-region has a dimension orthogonal to the orientation of its grating elements sufficient to accommodate at least ten grating elements. This requirement ensures that each sub-region replays with uniformity of brightness and colour saturation across substantially its entire areal dimension, including boundary portions.

In embodiments, each region comprises more than two sub-regions, with each sub-region having a different grating element orientation. In such a diffractive structure, as the device is tilted about the second axis, different ones of the sub-regions replay, allowing the first optical effect to be viewed at a plurality of tilt angles about the second axis. The angles of tilt about the second axis at which particular sub-regions replay may overlap so that at particular tilt angles about the second axis, more than one sub-region may replay. The difference in grating element orientation across the plurality of sub-regions within a region determines the range of tilt angles about the second axis at which at least one of the sub-regions (and therefore the respective region) will replay.

In a further embodiment, each region may comprise first and second arrays of sub-regions, each sub-region within an array having grating elements of the same orientation, and sub-regions within different arrays having grating elements of different orientation. Thus, at a particular angle of tilt of the device about the second axis, at least one of the arrays will replay, such that the optical effect seen on tilting the device about the first axis is seen for a range of tilt angle about the second axis. Preferably, the arrays are interlaced with each other such that a large areal fraction of a region replays at a particular angle of tilt about the second axis. The interlacing of the arrays means that the orientations of the sub-regions repeat in a cyclical manner within a region. In an interlaced arrangement of sub-regions, each sub-region typically has a dimension such that it is not discernible by the naked human eye.

The grating orientations of adjacent sub-regions within a region may be arranged in a contiguous manner, meaning that as the device is tilted about the second tilt axis, sub-regions are sequentially replayed in line with the respective grating element orientations. In other embodiments, the grating orientations of adjacent sub-regions are arranged in a non-contiguous manner.

In preferred embodiments, the orientational arrangement of the grating structures of the sub-regions is substantially the same for all regions. This ensures that for a particular angle of tilt about the second axis, corresponding sub-regions of each region will replay as the device is tilted about the first axis.

The regions of the first area and/or the first area itself may take substantially any geometric form, for example rectangles, squares, circles, ellipses or indicia such as alphanumerical characters of symbols. The sub-regions may take a geometric form that suitably conforms with the shape of the corresponding region, but preferably the sub-regions are in the form of elongate linear strips.

As set out above, the first region of the first area has a grating element pitch or spacing of less than or equal to 0.6 microns. In some embodiments, the first region of the first area has a grating element pitch or spacing of less than 0.5 microns. The end region of the first area has a grating element pitch or spacing of greater than or equal to 5 microns, preferably in the range of 5 microns to 10 microns.

In some embodiments, the diffractive structure further comprises a second area comprising a plurality of regions arranged as a second contiguous pattern, wherein the grating elements within a region of the second area have either (i) a constant pitch or (ii) a constant spacing along a second axis perpendicular to the first axis and wherein; the pitches or spacings of the plurality of regions of the second area increase from one region to the next between a first region having a grating element pitch or spacing of less than or equal to 0.6 microns and an end region having a grating element pitch or spacing of greater than or equal to 5 microns and further wherein; each region of the second area comprises at least first and second sub-regions having different grating element orientations corresponding to the orientations of the first and second sub-regions of the first area.

The second area has a substantially similar structure to the first area such that at substantially any angle of tilt about the first tilt axis when viewing the device along the first viewing direction, at least one of the regions of the second area replays a diffractive colour. Moreover, each region of the second area comprises at least first and second sub-regions having different grating element orientations corresponding to the orientations of the first and second sub-regions of the first area, meaning that both the first and second areas will exhibit their optically variable effects for substantially the same angle of tilt about the second axis.

Although the first and second areas may be configured to provide disparate optical effects, particularly preferably, each region of the second area corresponds to a respective region of the first area, such that the corresponding regions of the first and second areas are viewable at substantially the same angle of tilt about the first axis, and wherein; the regions of the second area are arranged such that upon tilting of the device about the first axis, the first and second areas exhibit complementary optical effects. A region of the second area typically corresponds with a region of the first area in that they have substantially identical grating pitches or spacings and therefore replay at the same angle of tilt about the first axis.

The term "complementary" is used here to mean that the optical effects exhibited by the first and second areas upon tilting about the first axis are associated with each other, and are preferably substantially opposing. For example, in embodiments the regions of both the first and second areas may be arranged in a substantially linear or curvilinear manner, wherein the pitches or spacings of the regions of the first area increase from one region to the next along a first direction, and the pitches of spacings of the regions of the second area increase from one region to the next along a second direction substantially opposing the first direction. When such a device is viewed along the first viewing direction and tilted about the first axis, the first area will exhibit a colour animation effect with colours appearing to move from region to region in one direction, and the second area will simultaneously exhibit substantially the same colour replays but with movement in the opposing (complementary) direction. The simultaneous exhibition of such complementary optical effects provides a particularly memorable effect to a user.

In another example, the regions of the first area may be arranged in a first concentric manner, with the regions of the second area being arranged in a second concentric manner substantially opposing the first concentric manner. Here the tem "opposing" is used to mean that where the first area has a region of fine pitch (less than or equal to 0.6 microns), the second area has a region of coarse pitch (greater than or equal to 5 microns), and vice versa. Upon tilting of the device about the first axis, when the first area appears to expand (as different regions are sequentially replayed), the second area will simultaneously appear to contract, and vice-versa.

In embodiments the first and second areas may substantially abut each other. For example, in the case of linear or curvilinear first and second areas, the areas may abut each other along the direction of perceived colour motion. In the case of first and second areas comprising concentrically arranged regions, the first and second areas may abut by the respective regions interlacing with each other.

In other embodiments the first and second areas may be spaced apart. Typically the first and second areas are in the form of substantially the same pattern, but in embodiments may be formed as substantially different patterns.

As described above with respect to the first area, the regions of the second area and/or the second area itself may take substantially any geometric form, for example rectangles, squares, circles, ellipses or indicia such as alphanumerical characters of symbols.

In accordance with a second aspect of the invention there is provided a method of forming a security device comprising: forming a diffractive structure in a carrier layer, wherein; the diffractive structure comprises a plurality of grating elements each having a principal component of orientation within the plane of the device substantially parallel with a first axis lying in the plane of the device; the diffractive structure having a first area comprising a plurality of regions arranged as a first contiguous pattern, wherein the grating elements within a region have either (i) a constant pitch or (ii) a constant spacing along a second axis orthogonal to the first axis and wherein; the pitches or spacings of the plurality of regions of the first area increase from one region to the next between a first region having a grating element pitch or spacing of less than or equal to 0.6 microns and an end region having a grating element pitch or spacing of greater than or equal to 5 microns such that; upon illumination and viewing along a first viewing direction substantially orthogonal to the first axis, the device exhibits a first optical effect in that at substantially any angle of tilt about the first axis at least one region exhibits a diffractive colour, and further wherein; each region comprises at least first and second sub-regions having different grating element orientations within the plane of the device such that the first optical effect is exhibited at more than one angle of tilt of the device about the second axis.

The resulting device provides all the benefits already discussed above.

In preferred embodiments the diffractive structure is formed by; providing a replication tool having a surface relief defining the first diffractive structure; and using the replication tool to form the surface of the carrier layer according to the surface relief, and preferably applying a reflection enhancing layer onto the carrier layer so as to follow the contours of the surface relief.

The replication tool may be manufactured by creating the surface relief in a recording medium layer and preferably transferring the surface relief to the surface of the replication tool.

The surface relief in the recording medium may typically be formed using optical or electron beam lithography. Optical lithography can produce grating elements with pitch or spacing down to approximately 0.5 microns, and with electron beam lithography, pitches or spacings less than 0.5 microns are achievable.

The method of the second aspect of the invention may be adapted to form a security device having any of the preferred features set out above in relation to the first aspect of the invention.

In accordance with a third aspect of the invention there is provided a security device made in accordance with the method of the second aspect.

In accordance with a fourth aspect of the invention there is provided a security article comprising a security device as already described, preferably a thread, stripe, patch, foil, transfer foil or insert. The security device of the present invention finds particular use in threads due to its optical effect being exhibited primarily on vertical tilting.

In accordance with a fifth aspect of the invention there is provided a security document comprising a security device according or security article as already described, the security document preferably comprising a banknote, identity document, passport, cheque, visa, license, certificate or stamp.

BRIEF DESCRIPTION OF THE DRAWINGS

Examples of the invention will now be described with reference to the attached drawings, in which:

FIGS. 12 to 14 show varies ways in which a security device according to the invention may be incorporated into a security document.

DETAILED DESCRIPTION

As has been described above, diffraction structures may have various different forms (e.g. amplitude- or phase-based). The ensuing description will focus on diffraction structures formed as a surface relief (i.e. phase-difference devices rather than amplitude-difference devices) since these lend themselves well to large volume replication.

Figure 1:
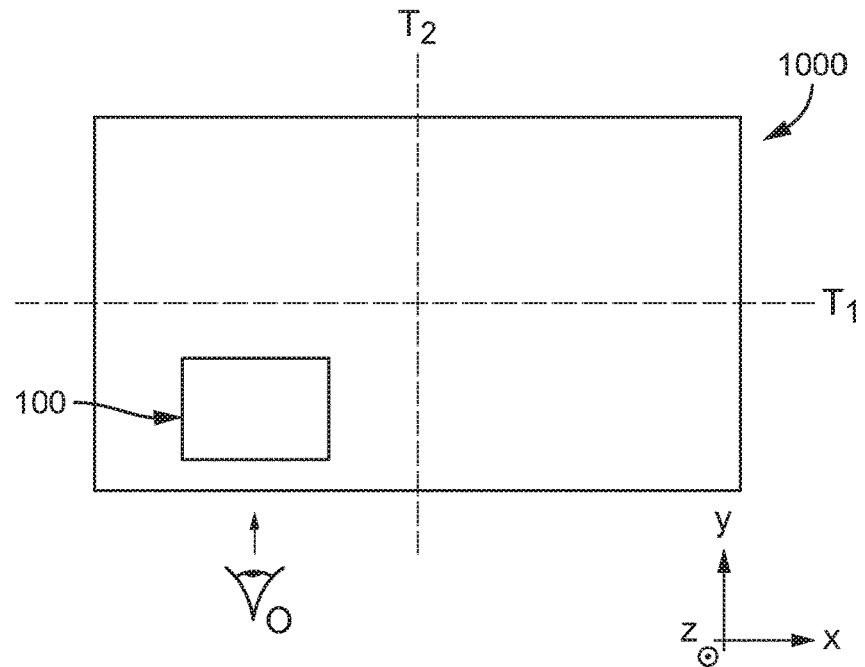
FIG. 1 is a plan view of a security document comprising a security device according to the present invention.

FIG. 1 is a plan view of a security document 1000 (here in the form of a banknote) comprising a security device 100 according to the present invention. The security device 100 is configured to provide a diffractive optically variable effect when the banknote is subjected to "vertical" tilting with respect to an observer O viewing the banknote along a viewing direction D parallel with the y axis; that is, tilted about a tilt axis T1 parallel with the x axis as shown in FIG. 1. This is in contrast to conventional diffractive security devices which are typically designed to be viewed either on "horizontal" tilting with respect to a viewer (i.e. the document is tilted about a tilt axis T2 parallel with the y axis), or on rotation of the document within its plane (i.e. rotated about the z axis in FIG. 1), neither of which is the most intuitive manipulation of the document.

Figure 2:
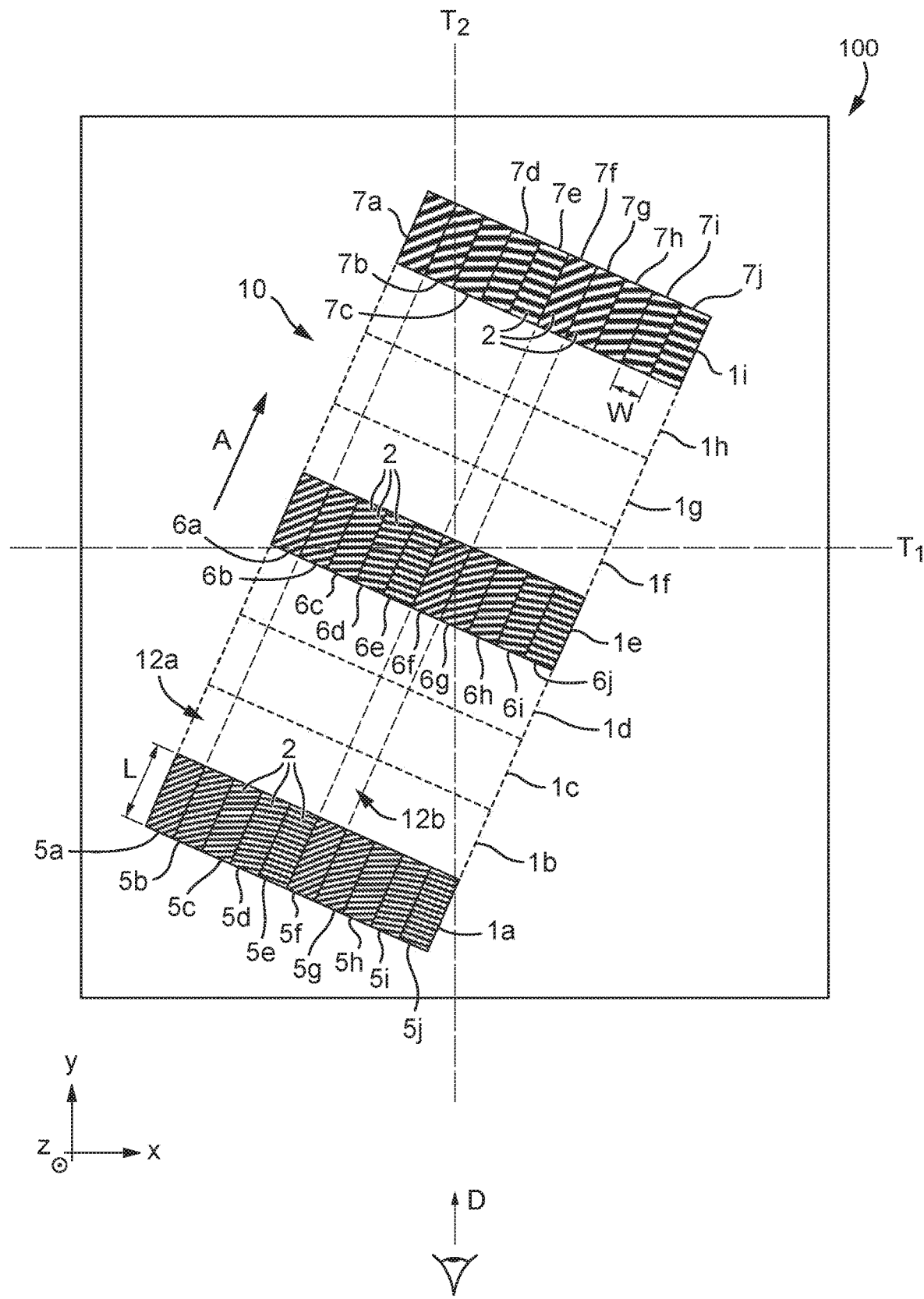
FIG. 2 is a plan view of a first example security device according to the invention.

FIG. 2 is a plan view of a first example security device 100 according to the invention. The diffractive structure of the device 100 comprises a first area 10 comprising a plurality of grating elements (generally shown at 2). The diffractive structure is in the form of a surface relief, with the lines in FIG. 2 representing the maximum heights of the surface relief.

The first area 10 is comprised of nine substantially rectangular regions 1a, 1b, 1c, 1d, 1e, 1f, 1g, 1h, 1i arranged as a contiguous pattern; in this embodiment as a linear arrangement extending from the bottom left to the top right of the device 100 in the view of FIG. 2. In this example adjacent regions abut one another. For clarity of illustration, the grating elements are shown in regions 1a, 1e and 1f only, but it will be appreciated that regions 1b, 1c, 1d, 1f, 1g and 1h all comprise grating elements.

The grating elements of the first region 1a have a constant pitch P1, the grating elements of the fifth region 1e have a constant pitch P2 and the grating elements of the ninth region have a constant pitch P3, wherein P3>P2>P1. In this particular example, the grating elements of the first region 1a have a constant pitch of 0.6 microns; the grating elements of the fifth region 1e have a constant pitch P2 of 2.8 microns, and the grating elements of the ninth region 1i have a constant pitch P3 of 5 microns. The pitch of the grating structures within the first area 10 increases from one region to the next from the first region 1a to the ninth region 1i along the direction of the contiguous pattern.

For the purposes of this discussion, the region having the smallest pitch (most lines per mm) within the area will be referred to as the "fine" region and the region having the largest pitch (fewest lines per mm) within the area will be referred to as the "coarse" region. Thus, in this example, the first region is referred to as the fine region and the ninth region is referred to as the coarse region. The regions (in this example regions 1b-1h) located between the fine and coarse regions will be referred to as intermediate regions. Although nine regions are illustrated in FIG. 2, it will be appreciated that fewer than nine, or more than nine, regions may be present within the first area. Furthermore, in this example, the pitch increases linearly from the fine region 1a to the coarse region 1i, although it will be appreciated that the pitch may increase from region to region in a non-linear manner.

As can be seen in FIG. 2, each region 1 is split into a plurality of sub-regions (for example region 1a comprises sub-regions 5a, 5b, 5c, ... 5j), with the sub-regions within a region having grating elements of the same pitch but varying in orientation. We will come back to discuss the effect of the sub-regions in more detail later, but for now we note that each of the grating elements within the device has a principal component of orientation parallel with the first tilt axis T1. In other words, their azimuthal angle $\varphi$ relative to the x axis is between −44 degrees and +44 degrees inclusive (in this example the grating elements all have an azimuthal angle of between −20 degrees and +20 degrees inclusive).

Figure 3:
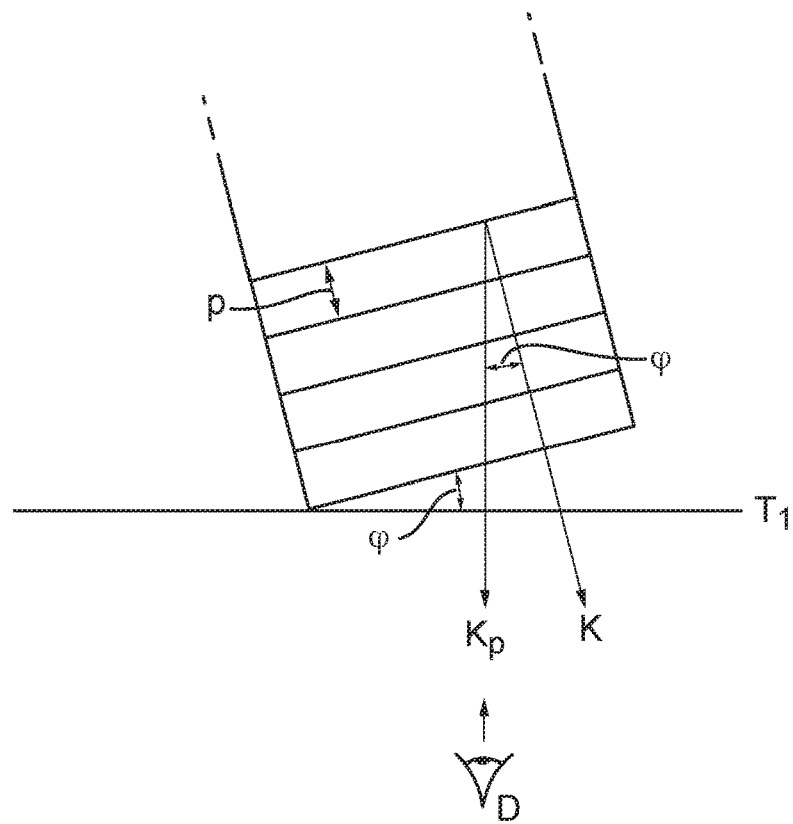
FIG. 3 schematically illustrates the azimuthal orientation of grating elements within a sub-region.

The azimuthal angle $\varphi$ is shown in FIG. 3 which illustrates an example sub-region 5a of grating elements. As is also shown FIG. 3, the grating elements have a grating vector k that is orthogonal to the orientation of the grating elements. The plane of dispersion of the grating elements, which is the plane within which white light is split into its constituent parts due to diffraction, intersects the plane of the device along the direction of the grating vector k. As each grating element within a device has an azimuthal angle $\varphi$ of between −44 degrees and +44 degrees, the projection of each of the grating vectors, $k_p$, on to the principal plane of dispersion of the device i.e. along the viewing direction D, is given by p/cos $\varphi$, where p is the pitch of the grating elements.

The colour exhibited by the grating elements is determined by this projection of the grating vector along the viewing direction D. Therefore, the wavelength (colour) exhibited by sub-regions having grating elements of different $\varphi$ will differ slightly for the same viewing angle. Therefore, as has been discussed above, in some embodiments the pitch p may be varied between sub-regions such that the grating vector projection along the viewing direction is the same for each sub-region. However, for ease of description, in the presently described examples, the pitch p of the grating elements within each sub-region is the same.

We now discuss the effect of the pitch variation of the grating elements of the regions 1 of the first area 10.

Figure 4:
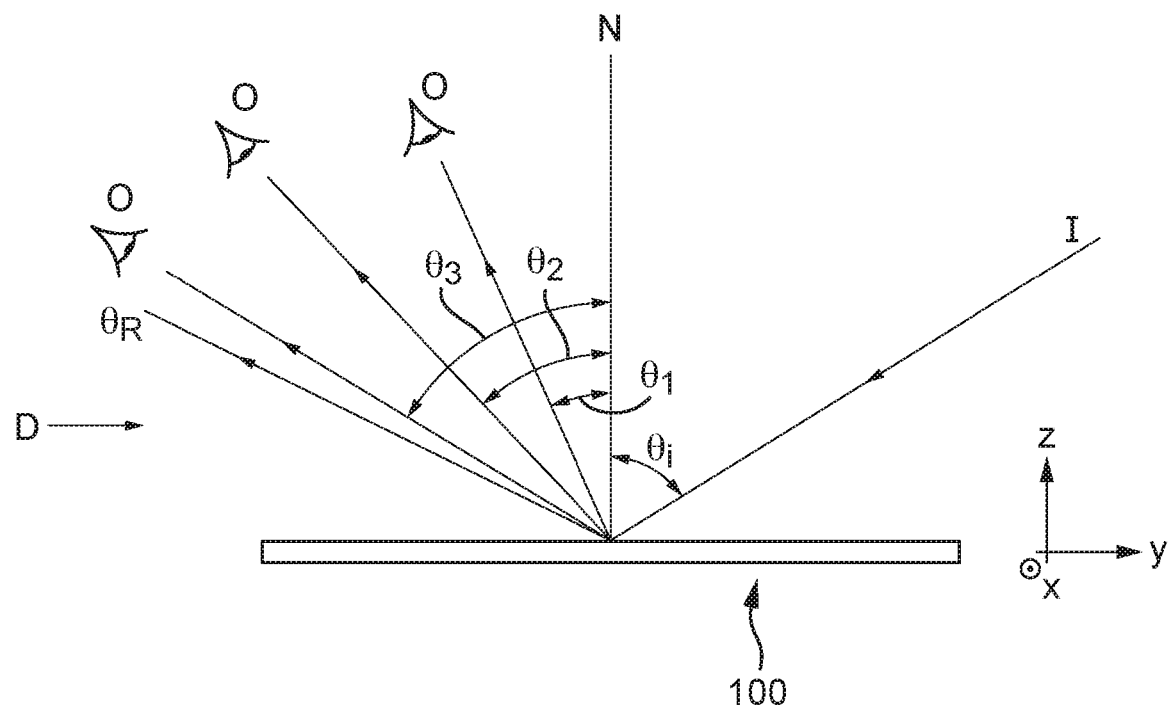
FIG. 4 schematically illustrates viewing the security device at different angles of tilt.

FIG. 4 is a view of the device 100 along the x axis and schematically illustrates an incident beam of light I of a particular wavelength impinging upon the device in the y-z plane at a particular illumination angle. The normal to the device 100 is along the z axis. An observer O views the device along viewing direction D parallel with the y axis. The angle between the observer O and the device normal is referred to as the tilt angle, here denoted by $\Theta$. A change in tilt angle $\Theta$ may be effected by tilting the device about the x axis with the observer remaining stationary, or by the observer moving along the y axis with the device remaining stationary.

According to diffraction theory, the fine region 1a will diffract the incident light such that it is visible at a tilt angle $\Theta 1$ that is further from the angle of specular reflection ($\Theta_R$) than light diffracted from the coarse region (visible at tilt angle $\Theta 3$). The intermediate regions will diffract light to intermediate viewing angles between $\Theta 1$ and $\Theta 3$. The tilt angles required to replay each region are affected by the illumination angle.

The variation in pitch between the fine and coarse regions of the diffractive structure means that the diffraction effects of the device 100 are viewable at substantially all tilt angles $\Theta$ when the device is viewed along the direction D and tilted relative to the observer about the tilt axis T1. In other words, the device replays at least one region at substantially all viewing angles within the principal plane of dispersion of the device. In particular, the pitch of the coarse region 1i being 5 microns (and in other examples greater than 5 microns) means that incident light diffracted from this region will be visible at tilt angles $\Theta$ close to the angle of specular reflection (typically within 6 degrees of the specular reflection angle), advantageously meaning that there is a very small angle of tilt through which diffraction effects are not observed. In this manner the device may be referred to as a substantially on-axis diffractive device.

When white light is incident upon the device 100, each region 1 will diffract light of different wavelengths to different viewing angles within the y-z plane (principal plane of dispersion) such that, at a particular angle of tilt about T1, a region will exhibit a particular wavelength of light (i.e. colour). Therefore, due to the range of grating element pitch along the regions of the first area of the device, at substantially any one viewing angle of the device 100 along the viewing direction D, at least one of the regions 1 will exhibit a diffractive colour. As the device is tilted about the tilt axis T1 and the viewing angle is changed, different regions will replay. Furthermore, since the pitches of the regions increase from one region to the next, the exhibited diffractive colours are perceived to move sequentially along the regions of the first area as the regions sequentially replay, providing a memorable colour animation effect. This is indicated by arrow A, which illustrates the perceived movement of colour from the fine region 1a to the coarse region 1i as the device is tilted about tilt axis T1 towards the specular reflection angle.

It will be appreciated that each region will exhibit diffractive colours over a range of viewing angles along viewing direction D, with the viewing angle ranges of some regions overlapping. This means that at least at some viewing angles, more than one region is replayed, with different regions exhibiting different wavelengths (i.e. colours) at that viewing angle. Each region is typically viewable over a range of viewing angles, with the region exhibiting different colours over the range of viewing angles.

As outlined above, each region 1 comprises a plurality of sub-regions. Region 1a comprises 10 sub-regions 5a-5j; similarly sub-region 1e comprises 10 sub-regions 6a-6j and region 1i comprises 10 sub-regions 7a-7j. More specifically, each region comprises five interlaced arrays of sub-regions, with the grating elements within each array having the same orientation (azimuthal angle). Referring to the sub-arrays of region 1e, the first array comprises sub-regions 6a and 6f; the second array comprises sub-regions 6b and 6g; the third array comprises sub-regions 6c and 6h; the fourth sub-array comprises sub-regions 6d and 6i; and the fifth array comprises sub-regions 6e and 6j. In practice, each array will typically comprise more than two sub-regions.

In this example, the grating elements of the first to fifth arrays have azimuthal angles φ of +20, +10, 0, −10 and −20 degrees respectively. The orientations of the grating elements of the sub-regions may be described as being arranged in a contiguous cyclic manner. The sub-regions of the other regions of the device are arranged in the same manner.

The range of azimuthal angles φ of the sub-regions is 20 degrees, giving a difference in grating vector projections along the viewing direction D of 1/cos 20=1.065 (6.5%). This is a very small variation and therefore each sub-region will be perceived by the naked human eye to be substantially the same colour.

Due to the difference in orientation of the grating elements in the sub-regions, different sub-regions will replay upon tilting of the device about a tilt axis T2 substantially parallel to the viewing direction (i.e. when tilted about the y axis in the configuration of FIG. 2). The use of sub-regions having grating elements of differing orientation ensures that the colour motion effect exhibited upon tilting of the device about tilt axis T1 is seen for varying angles of tilt about tilt axis T2. The difference in orientation across the sub-regions determines the range of tilt about the tilt axis T2 within which the colour motion effect upon tilting about tilt axis T1 is observed.

In this embodiment, the arrangement of the grating element orientations across the sub-regions is the same for each region of the first area. Therefore, the sub-regions having the same grating element orientation (i.e. the sub-regions of an array) can be seen to define channels extending along the first area. This is illustrated in FIG. 2 where the sub-regions 5a, 6a and 7a (together with the respective sub-regions in intermediate regions 1b, 1c, 1d, 1f, 1g, 1h) having the same orientation define channel 12a, and sub-regions 5f, 6f and 7f (together with the respective sub-regions in the intermediate regions) define channel 12b. Channels 12a and 12b have the same grating element orientation. The other arrays of sub-regions can be seen to define channels in the corresponding manner.

Thus, at a particular angle of tilt about tilt axis T2, the sub-regions of channels 12a and 12b will replay and the colour motion effect will be observed on tilting about the tilt axis T1. At different angles of tilt about tilt axis T2, other channels will replay, and thus the colour motion effect upon vertical tilting is readily observed. Typically, more than one channel will replay at a particular angle of tilt about tilt axis T2.

Although the arrangement of the grating element orientations across the sub-regions is the same for each region of the first area, this is not necessarily the case, and in other embodiments the sub-regions may have differing orientation arrangements across the regions.

Each sub-region has a dimension along the direction of the grating vector of the respective grating elements so as to accommodate at least 10 grating elements. This is in order to ensure that each part of a sub-region has uniform brightness and colour saturation. In the present example, each region (and therefore each sub-region within that region) has a length L along the direction of the contiguous pattern of approximately 200 microns and thus even for the coarse region 1i having a pitch of 5 microns, this condition is satisfied. (It is to be noted that the lines representing the grating elements in FIG. 2 are schematic only and not to scale).

Figure 5:
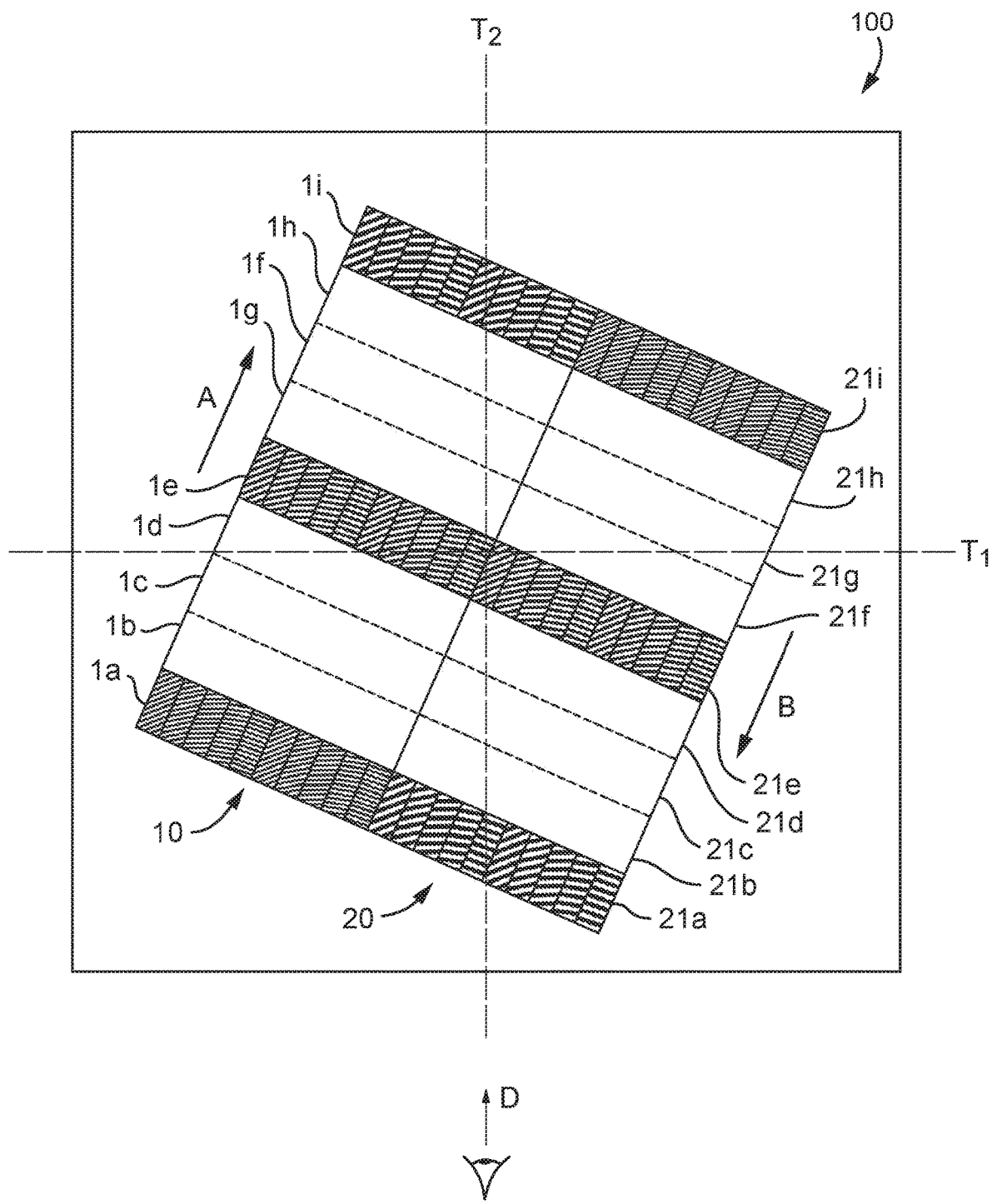
FIG. 5 is a plan view of a second example security device according to the invention.

FIG. 5 is a plan view of a further example device 100 according to the invention. In this example the diffractive structure of the device 100 comprises first 10 and second 20 areas. As with the example seen in FIG. 2, the first area comprises a plurality of regions 1a, 1b . . . 1i arranged as a contiguous linear pattern extending along a first pattern direction A from a fine region 1a at the bottom left of the device to a coarse region 1i at the top right of the device. The second area is formed as a complementary plurality of regions 21a, 21b, . . . 21i extending from a fine region 21i at the top right of the device to its coarse region 21a at the bottom left of the device. The first and second areas 10, 20 are parallel and abut one another along their length.

The regions of the second area 20 are complementary to the regions of the first area 10 in that the coarse region 21a of the second area is substantially identical to the coarse region 1i of the first area 10, the fine region 21i of the second area is substantially identical to the fine region 1a of the first area, and where the regions of the first area extend in a first pattern direction A from its fine region to its coarse region, the regions of the second area extend in a substantially opposite pattern direction B from its fine region to its coarse region. The intermediate regions of the second area complement the intermediate regions of the first area in a similar manner (for example regions 1b and 21h are substantially identical, as are regions 1c and 21g, 1d and 21f, and 1e and 21e).

Consequently, when the device 100 is viewed along the direction D and tilted about the tilt axis T1 towards the specular reflection angle, the first area 10 exhibits a colour motion effect with colours appearing to move from region to region along the direction A (i.e. from its fine region to coarse region), and the second area 20 exhibits a complementary colour motion effect moving along the opposite direction B from its fine region to its coarse region. This complementary motion effect upon vertical tilting of the device is particularly striking to an observer.

Figure 9:
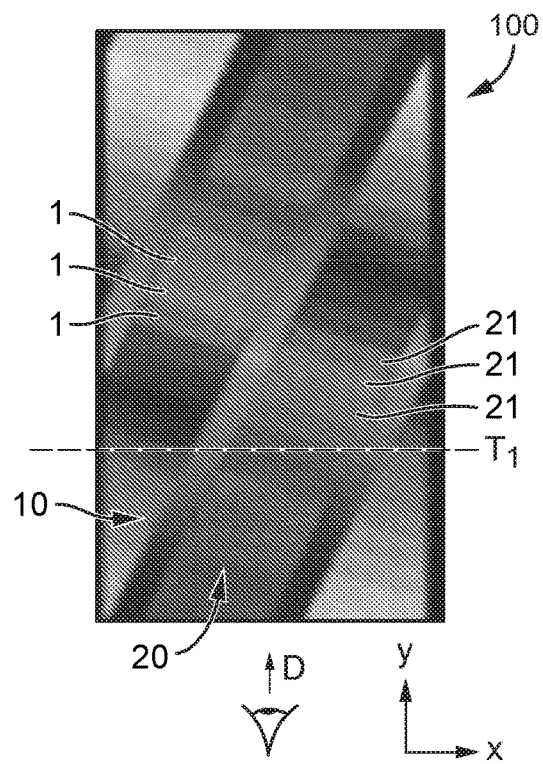
FIGS. 9 to 11 are images showing example security devices according to the invention.

FIG. 9 is an image of the example security device when viewed along viewing direction D and at a particular angle of tilt about tilt axis T1. The first and second areas 10, 20 are clearly seen, as are the regions of each area which are exhibited as coloured bands generally shown at 1 and 21. At this viewing angle, each of the regions shown in FIG. 9 exhibits a diffractive colour.

In the examples seen in FIGS. 2 and 5, the first and second areas were arranged as a contiguous linear arrangement of rectangular regions. However, the first (and if present, second) areas and/or regions may be arranged to define other shapes and/or indicia, for example as illustrated in FIGS. 6a and 6b.

Figure 6:
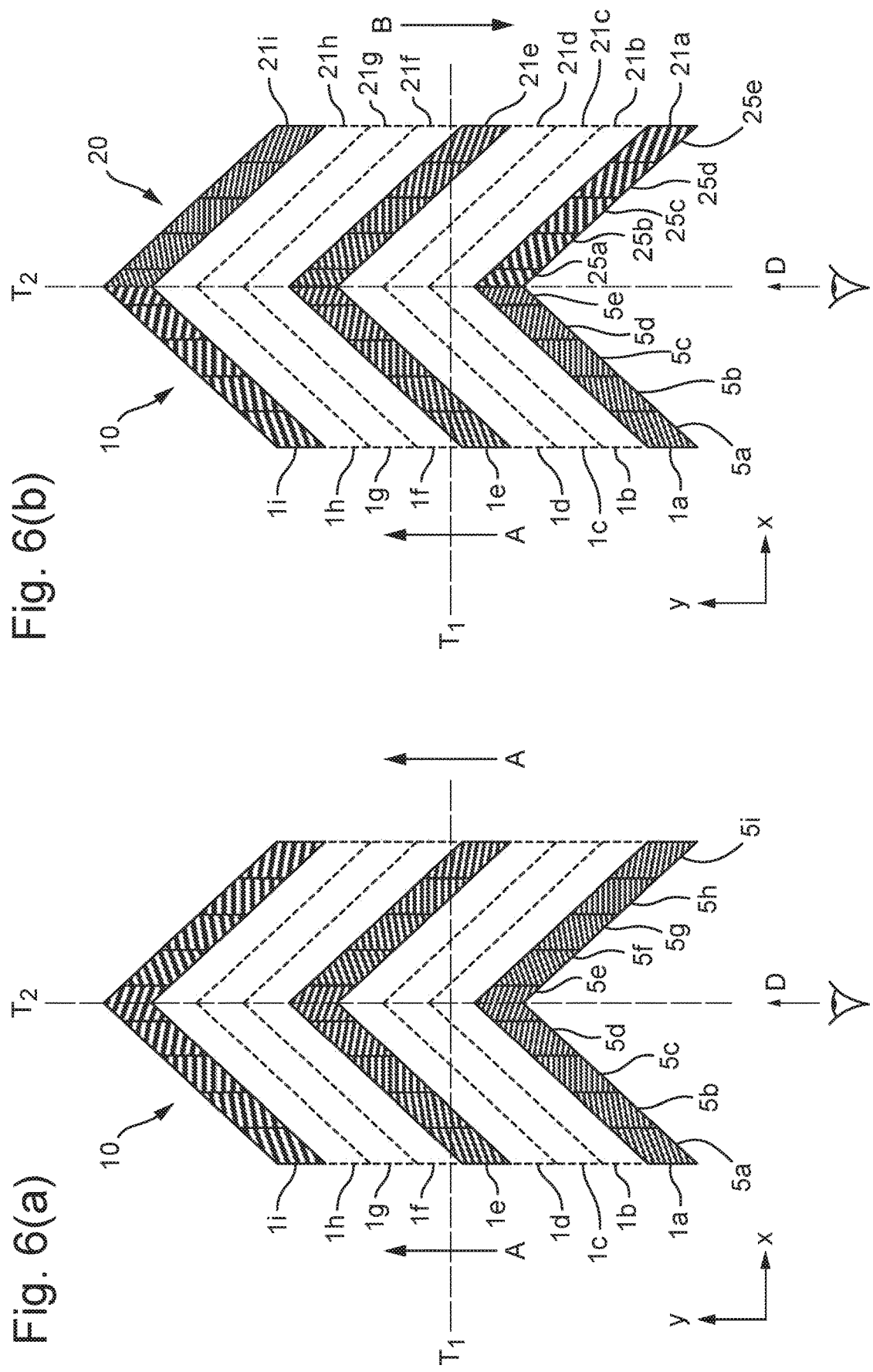
FIGS. 6a, 6b, 7 and 8 illustrate plan views of further example security devices according to the invention.

FIG. 6a schematically illustrates a diffractive structure that may be used in a device according to the invention. Here the diffractive structure comprises a first area 10, comprising a plurality of regions 1a, 1b, . . . , 1i, with each region being in the form of an chevron. As with the examples of FIGS. 2 and 5, the pitches of the plurality of regions increase from one region to the next from a fine region 1a to a coarse region 1i. Each grating element has a principal component of orientation substantially parallel to the tilt axis T1 such that they have a common grating vector projection along viewing direction D. Upon tilting of the device relative to a viewer about the tilt axis T1 towards the angle of specular reflection, the device exhibits movement of colour from one region to the next along the direction A, i.e. from the fine region 1a to the coarse region 1i.

Each region 1 of the first area 10 in FIG. 6a comprises a plurality of sub-regions. For clarity of description, only the sub-regions of the fine region 1a are labelled in FIG. 5a, but each region of area 10 comprises corresponding sub-regions.

Fine region 1*a* comprises sub-regions 5*a*, 5*b*, 5*c*, . . . 5*i*, which in this example each have a different orientation within the plane of the device. Under illumination by collimated light each sub-region would replay at different angles of tilt about tilt axis T2. However, in typical ambient lighting conditions which is highly diffuse in the horizontal x direction, all the sub-regions will be visible.

FIG. 6*b* illustrates an alternative diffractive structure comprising first 10 and second 20 areas arranged to provide a complementary colour animation effect upon tilting about tilt axis T1. Both the first area 10 and second area 20 comprise a contiguous arrangement of a plurality of substantially rhomboidal regions, with the first and second areas abutting one another so as to form the chevron configuration seen in FIG. 6*a*. In a similar manner to the embodiment shown in FIG. 5, the regions of the first area 10 increase in pitch from one region to the next from a fine region 1*a* to a coarse region 1*i* along a pattern direction A, with the regions of the second area increasing in pitch from one region to the next from a fine region 21*i* to a coarse region 21*a* along a substantially opposing pattern direction B. The first and second areas comprise the same number of regions, with each region of the first area having a complementary region of the second area, as explained above in relation to FIG. 5. Consequently, upon tilting of the device about the tilt axis T1 towards the specular reflection angle and viewing along the viewing direction D, the first area 10 exhibits movement of colour from one region to the next along the direction of arrow A, and second area 20 simultaneously exhibits substantially the same movement of colour from one region to the next, except along the opposing direction as indicated by arrow B.

In a similar manner to FIG. 6*a*, each region of an area comprises a plurality of sub-regions (e.g. region 1*a* of first area 10 comprises sub-regions 5*a*-5*e*), with each sub-region having a different grating element azimuthal angle.

Figure 10:
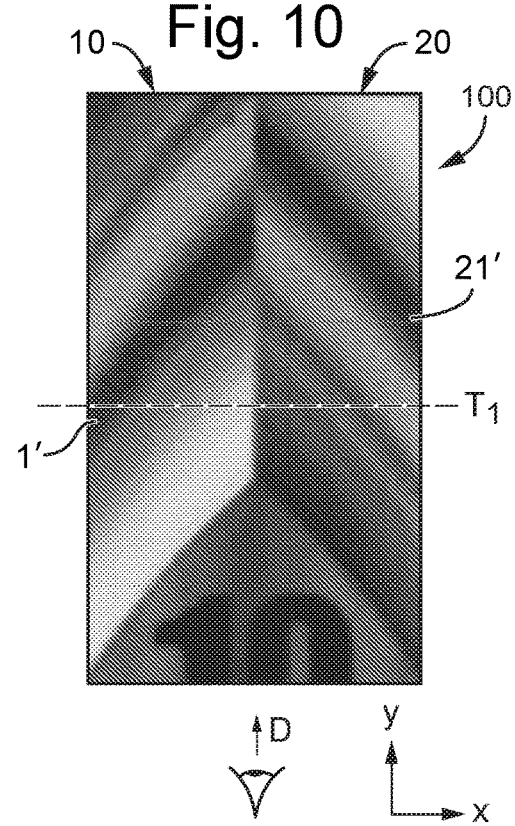

FIG. 10 is an image of the example security device of FIG. 6*b* when viewed at a first angle of tilt about tilt axis T1 and along the viewing direction D. Similarly to FIG. 9, the regions are clearly visible. The complementary nature of the first and second areas 10, 20 is clearly seen, for example region 1' of the first area 10 corresponds to (is complementary to) region 21' of second area 20.

Figure 7:
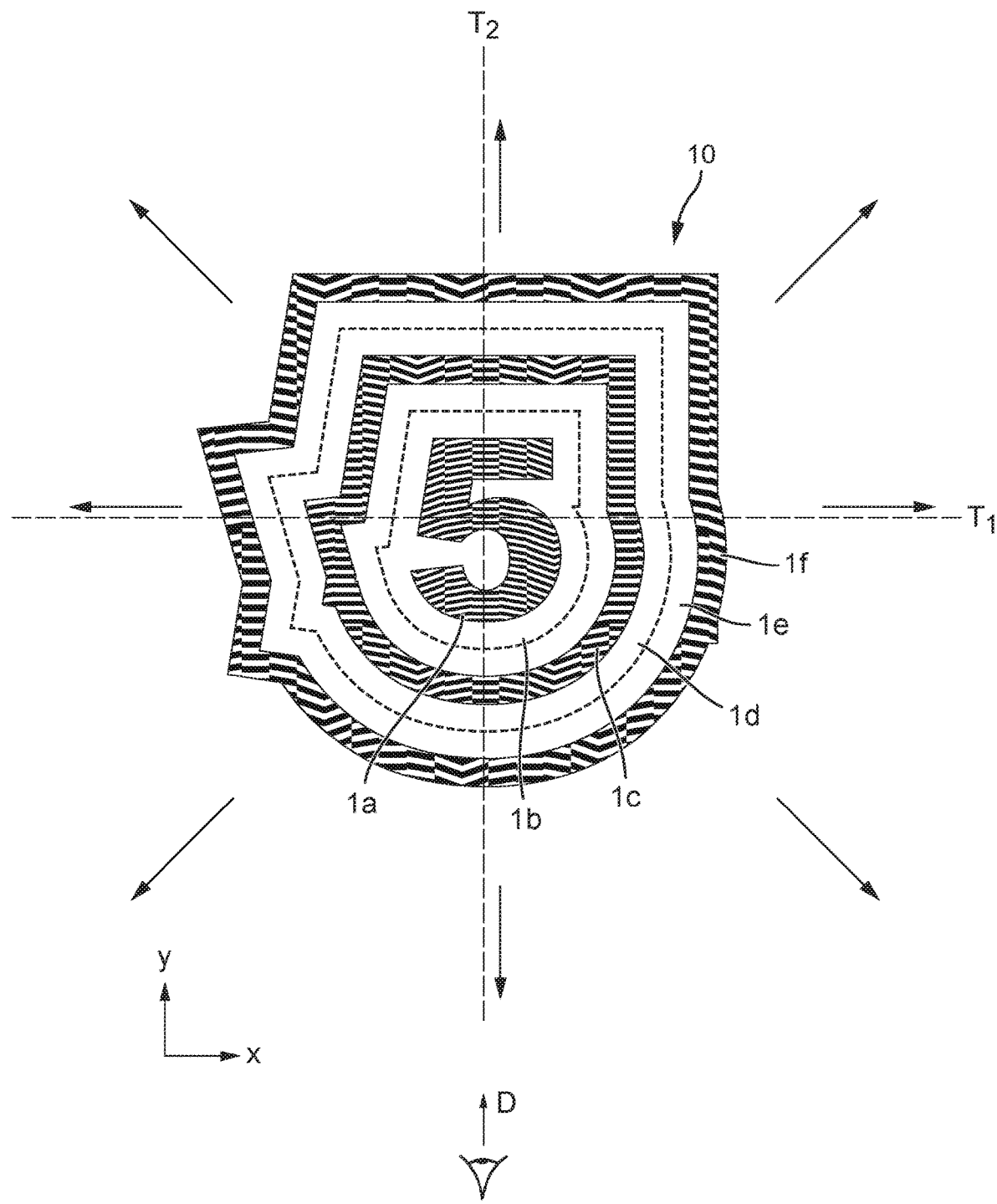

In the examples described so far, the regions of grating elements have been arranged in a substantially linear form in order to provide colour motion effects moving in a particular direction upon vertical tilting of the device. FIG. 7 is an example of a diffractive structure that may be used to provide an expansion and contraction effect upon tilting about the tilt axis T1. Here, first area 10 comprises a plurality of regions arranged in a contiguous pattern as before, but in this example the regions 1*a*, 1 *b*, . . . 1*f* are arranged substantially concentrically, in the sense that they each share a substantially common central point. For clarity of illustration, the grating elements are only shown in regions 1*a*, 1*c* and 1*f*. Again, each grating element has a principal component of orientation parallel with tilt axis T1.

The first region 1*a* is in the form of a "5" and comprises grating elements having the smallest pitch within the diffractive structure, and is therefore the "fine" region. The pitch of the grating elements within the fine region 1*a* is less than or equal to 0.6 microns. The regions surrounding the first region 1*a* are in the form of closed loops and substantially abut each other. The pitches of the grating elements increase from one region to the next from the fine first region 1*a* to coarse region 1*f* which has grating elements of pitch greater than or equal to 5 microns.

Therefore, upon viewing the device along viewing direction D and tilting of the device about tilt axis T1 towards the specular reflection viewing angle, the contiguous pattern of the first area 10 appears to expand along the direction of the arrows (i.e. in a substantially radial direction) as the regions sequentially replay in the direction of the arrows. Furthermore, the diffractive colours exhibited by the regions appear to move from one region to the next from the fine area 1*a* to the coarse area 1*f*. Conversely, when the device is tilted away from the specular reflection viewing angle, the contiguous pattern of the first area appears to contract as the inner regions with smaller pitch replay at viewing angles away from the specular reflection angle. The diffractive colours appear to move from one region to the next from the fine coarse area to the fine area.

As schematically shown in FIG. 7, each region comprises a plurality of sub-regions as has been described above. In this example, the regions comprise five interlaced arrays of sub-regions as described above in relation to the FIG. 2 example.

Figure 11:
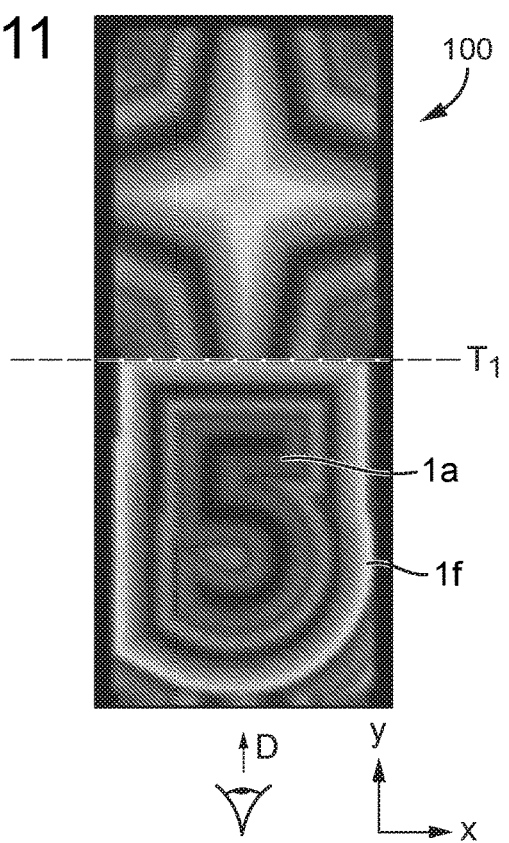

FIG. 11 is an image of the example security device of FIG. 7 (bottom half of FIG. 11) when viewed along viewing direction D and tilted about tilt axis T1. At this particular tilt angle, which is close to the angle of specular reflection, the outer coarse region 1*f* is replayed and the inner fine region 1*a* (i.e. the "5") is not replayed. As such, FIG. 11 shows the device in its "expanded" viewing orientation.

Figure 8:
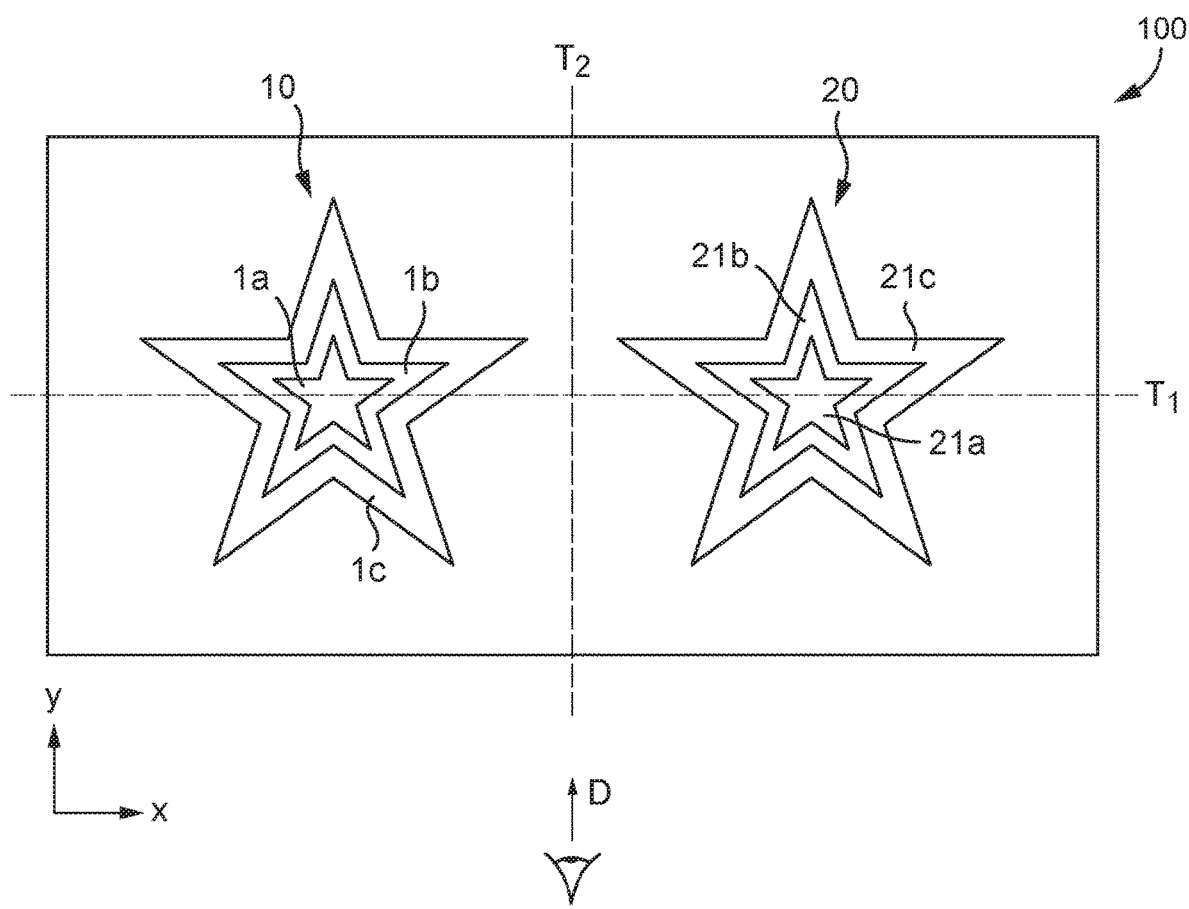

FIG. 8 schematically illustrates a further example of a device 100 according to the present invention. Here the diffractive structure comprises two areas 10, 20 that are spaced apart, with each area arranged as a contiguous pattern of star-shaped regions. For clarity of illustration, the grating elements and sub-regions of each region have been omitted from the figure.

The first area 10 comprises first 1*a*, second 1*b* and third 1*c* star shaped regions arranged in a substantially concentric manner, with the pitch of the grating elements of each region increasing from region to region from the first "fine" region 1*a* to the third "coarse" region 1*c*. The second area 20 comprises first 21*a*, second 21*b* and third 21*c* star shaped regions arranged in a substantially concentric manner, with the pitch of the grating elements of each region decreasing from region to region from the first "coarse" region 21*a* to the third "fine" region 21*c*. The shapes and sizes of the regions of the first and second areas are substantially identical; for example, the shape of size of first region 1*a* of the first area 10 is substantially identical to the shape and size of first region 21*a* of the second area 20. The pitch of the fine region 1*a* of first area 10 is substantially the same as the pitch of the fine region 21*c* of the second area such that regions 1*a* and 21*c* are exhibited at the same angle of tilt about T1. In this manner, regions 1*a* and 21*c* may be seen as corresponding or complementary regions. Similarly, regions 1*b* and 21*b* will replay at the same tilt angle, as will regions 1*c* and 21*a*.

Thus, as the device 100 is tilted about the tilt axis T1 towards the specular reflection viewing angle, the star of the first area 10 appears to expand in size, whilst simultaneously the star of the second area 20 appears to contract in size as the regions of different pitch exhibit their diffractive colours at different angles of tilt. This "pumping" effect of simultaneous expansion and contraction of indicia (here stars) together with the perceived colour movement from region to region is a particularly memorable effect to a viewer.

In the view of FIG. 8, both the first 10 and second 20 areas comprise three regions. However, it will be appreciated that each area will typically comprise more than three regions, i.e. more than one intermediate region between the regions of smallest and largest pitch. Furthermore, the star-shaped first and second areas 10, 20 are spaced apart along the x axis in the view of FIG. 8 (horizontally spaced), but in other embodiments may be spaced apart in different directions, for example being vertically spaced along the y axis (for example as in FIG. 11). In other examples the first and second areas may be in the form of differing indicia.

Figure 14A:
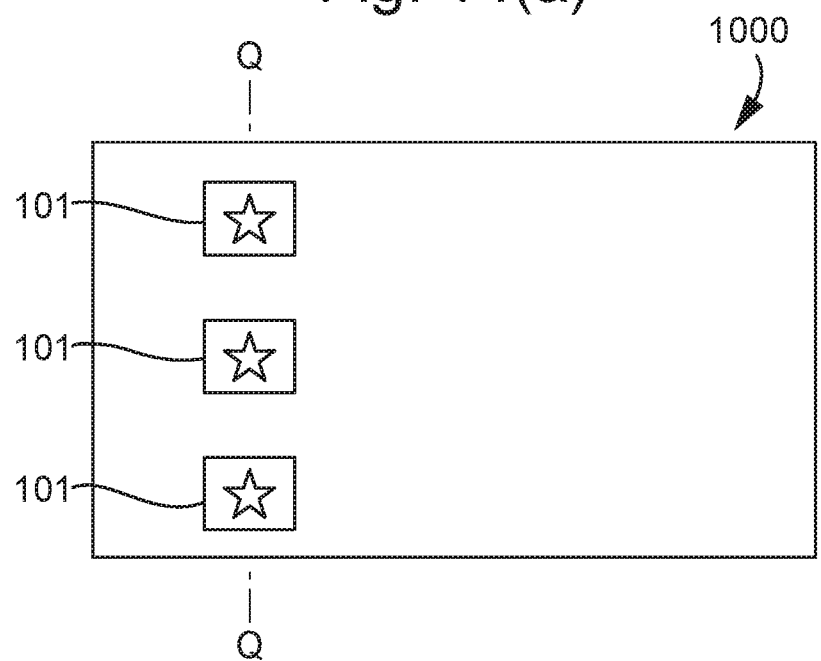

The device of the present invention may be designed to be viewed in reflection or transmission. FIGS. 12, 13 and 14 depict examples of security documents in which security devices of the sorts described above have been incorporated. FIG. 12 shows a first exemplary security document, here a banknote 1000, in (a) plan view and (b) cross-section along line Q-Q'. Here, the banknote 1000 is a polymer banknote, comprising an internal transparent polymer substrate 102 which is coated on each side with opacifying layers 103a and 103b in a conventional manner. In some cases, the opacifying layers may be provided on one side of the substrate 102 only. The opacifying layers 103a and 103b are omitted in a region of the document so as to define a window 101, here having a square shape. Within the window region 101 is located a security device 100 in accordance with any of the embodiments discussed above. The security device 100 may be formed by cast-curing a suitable carrier material 50 onto the substrate 102, in which the desired relief structure is formed. Alternatively, the security device 100 may have been formed separately on a security article such as a transfer patch or label. In this case, the security device 1 may be affixed to the transparent substrate 102 inside the window region 101 by means of a suitable adhesive. Application may be achieved by a hot or cold transfer method e.g. hot stamping.

It should be noted that a similar construction could be achieved using a paper/plastic composite banknote in which the opacifying layers 103a and 103b are replaced by paper layers laminated (with or without adhesive) to an internal transparent polymer layer 102. The paper layers may be omitted from the window region from the outset, or the paper could be removed locally after lamination. In other constructions, the order of the layers may be reversed with a (windowed) paper layer on the inside and transparent polymer layers on the outside.

FIG. 12 shows the use of a "full" window where the regions where the opacifying layers are omitted are in register. It will be appreciated that the device 100 may be applied in a "half window", for example in a case where opacifying layer 103b was present across window region 101.

In FIG. 13, the banknote 1000 is of conventional construction having a substrate 102 formed for example of paper or other relatively opaque or translucent material. The window region 101 is formed as an aperture through the substrate 102. The security device 100 is applied as a patch overlapping the edges of window 101 utilising an adhesive to join the security article to the document substrate 102. Again, the application of the security device and document could be achieved using various methods including hot stamping. FIG. 13(b) shows a variant in which the window 101 is omitted and the device 100 is simply applied to a section of the substrate 102 using any convenient application technique such as hot stamping. In such arrangements the device 100 will of course only be viewable from one side of the security document 100.

Figure 14B:
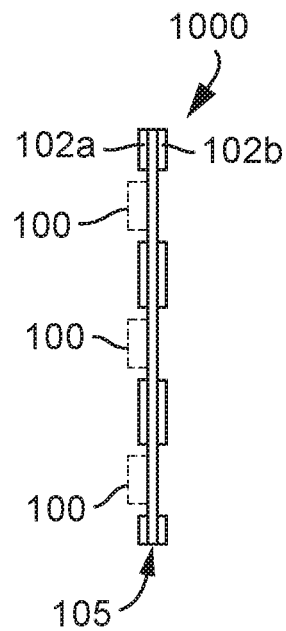
Figure 14C:
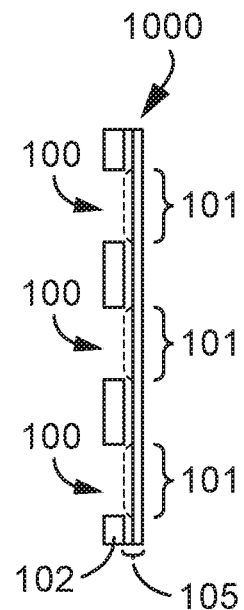

FIG. 14 depicts a third example of a security document, again a banknote 1000, to which a security article 105 in the form of a security thread or security strip has been applied. Three security devices 100 each carried on the strip 105 are revealed through windows 101, arranged in a line on the document 1000. Two alternative constructions of the document are shown in cross-section in FIGS. 14(b) and 14(c). FIG. 14(b) depicts the security thread or strip 105 incorporated within the security document 1000, between two portions of the document substrate 102a, 102b. For example, the security thread or strip 105 may be incorporated within the substrate's structure during the paper making process using well known techniques. To form the windows 101, the paper may be removed locally after completion of the paper making process, e.g. by abrasion. Alternatively, the paper making process could be designed so as to omit paper in the desired window regions. FIG. 14(c) shows an alternative arrangement in which the security thread or strip 105 carrying the security device 100 is applied to one side of document substrate 102, e.g. using adhesive. The windows 101 are formed by the provision of apertures in the substrate 102, which may exist prior to the application of strip 105 or be formed afterwards, again for example by abrasion.

Many alternative techniques for incorporating security documents of the sorts discussed above are known and could be used. For example, the above described device structures could be formed on other types of security document including identification cards, driving licenses, bankcards and other laminate structures, in which case the security device may be incorporated directly within the multilayer structure of the document.

The invention claimed is:

1. A security device comprising a diffractive structure, the diffractive structure comprising a plurality of grating elements each having a principal component of orientation within the plane of the device substantially parallel with a first axis lying in the plane of the device;

the diffractive structure having a first area comprising a plurality of regions arranged as a first contiguous pattern, wherein the grating elements within a region have either (i) a constant pitch or (ii) a constant spacing along a second axis orthogonal to the first axis, wherein the pitches or spacings of the plurality of regions of the first area increase from one region to the next between a first region having a grating element pitch or spacing of less than or equal to 0.6 microns and an end region having a grating element pitch or spacing of greater than or equal to 5 microns such that, upon illumination and viewing along a first viewing direction substantially orthogonal to the first axis, the device exhibits a first optical effect in that at substantially any angle of tilt about the first axis at least one region exhibits a diffractive colour, and each region comprises a plurality of sub-regions having respective grating element orientations within the plane of the device, wherein the orientations of the grating elements of the plurality of sub-regions are such that the diffractive colours exhibited by the plurality of sub-regions within a region are perceived to be the same upon tilting of the device about the second axis, and wherein the grating element orientations of the sub-regions within a region have a repeating arrangement whereby the first optical effect is the same and perceived to be replayed at more than one angle of tilt of the device about the second axis.

2. The device of claim 1, wherein the first optical effect further comprises, when the device is tilted about the first tilt axis, diffractive colours exhibited by the regions appear to move from one region to the next within the contiguous pattern.

3. The device of claim 1, wherein the pitches or spacings of the plurality of regions increase from one region to the next in a substantially linear manner.

4. The device of claim 1, wherein each sub-region has a dimension orthogonal to the orientation of its grating elements such that it accommodates at least 10 grating elements.

5. The device of claim 1, wherein the geometry of each sub-region is such that substantially each part of the sub-region has a dimension orthogonal to the orientation of its grating elements sufficient to accommodate at least ten grating elements.

6. The device of claim 1, wherein each sub-region has a dimension such that it is not discernible by the naked human eye.

7. The device of claim 1, wherein each region comprises first and second arrays of sub-regions, each sub-region within an array having grating elements of the same orientation, and sub-regions within different arrays having grating elements of different orientation.

8. The device of claim 7, wherein the arrays are interlaced with each other.

9. The device of claim 7, wherein the grating orientations of adjacent sub-regions are arranged in a non-contiguous manner.

10. The device of claim 1, wherein the regions of the first area are arranged in a substantially linear or curvilinear manner along a pattern direction, and wherein the grating element pitches or spacings of the regions increase from one region to the next along the pattern direction.

11. The device of claim 1, wherein the regions of the first area are arranged in a substantially concentric manner.

12. The device of claim 1, wherein the diffractive structure further comprises a second area comprising a plurality of regions arranged as a second contiguous pattern, wherein the grating elements within a region of the second area have either (i) a constant pitch or (ii) a constant spacing along a second axis perpendicular to the first axis, the pitches or spacings of the plurality of regions of the second area increase from one region to the next between a first region having a grating element pitch or spacing of less than or equal to 0.6 microns and an end region having a grating element pitch or spacing of greater than or equal to 5 microns, and each region of the second area comprises at least first and second sub-regions having different grating element orientations corresponding to the orientations of the first and second sub-regions of the first area.

13. The device of claim 12, wherein each region of the second area corresponds to a respective region of the first area, such that the corresponding regions of the first and second areas are viewable at substantially the same angle of tilt about the first axis, and the regions of the second area are arranged such that upon tilting of the device about the first axis, the first and second areas exhibit complementary optical effects.

14. The device of claim 12, wherein the regions of both the first and second areas are arranged in a substantially linear or curvilinear manner, and the pitches or spacings of the regions of the first area increase from one region to the next along a first direction, and the pitches of spacings of the regions of the second area increase from one region to the next along a second direction substantially opposing the first direction.

15. The device of claim 12, wherein the regions of the first area are arranged in a first concentric manner, and the regions of the second area are arranged in a second concentric manner substantially opposing the first concentric manner.

16. The security device of claim 1, wherein the first area and/or at least one of the regions of the first area defines indicia.

17. A method of forming a security device comprising:

forming a diffractive structure in a carrier layer, wherein the diffractive structure comprises a plurality of grating elements each having a principal component of orientation within the plane of the device substantially parallel with a first axis lying in the plane of the device, the diffractive structure having a first area comprising a plurality of regions arranged as a first contiguous pattern, wherein the grating elements within a region have either (i) a constant pitch or (ii) a constant spacing along a second axis orthogonal to the first axis, the pitches or spacings of the plurality of regions of the first area increase from one region to the next between a first region having a grating element pitch or spacing of less than or equal to 0.6 microns and an end region having a grating element pitch or spacing of greater than or equal to 5 microns such that, upon illumination and viewing along a first viewing direction substantially orthogonal to the first axis, the device exhibits a first optical effect in that at substantially any angle of tilt about the first axis at least one region exhibits a diffractive colour, and each region comprises a plurality of sub-regions having respective grating element orientations within the plane of the device, wherein the orientations of the grating elements of the plurality of sub-regions are such that the diffractive colours exhibited by the plurality of sub-regions within a region are perceived to be the same upon tilting of the device about the second axis, and wherein the grating element orientations of the sub-regions within a region have a repeating arrangement whereby the first optical effect is the same and perceived to be replayed at more than one angle of tilt of the device about the second axis.

18. A security article comprising a security device according to claim 1, a thread, stripe, patch, foil, transfer foil or insert.

19. A security document comprising a security device according to claim 1, the security document comprising a banknote, identity document, passport, cheque, visa, license, certificate or stamp.

* * * * *